United States Patent
Park et al.

(10) Patent No.: US 9,862,372 B2
(45) Date of Patent: Jan. 9, 2018

(54) METHOD AND APPARATUS FOR CONTROLLING ENGINE START FOR HYBRID ELECTRIC VEHICLE

(71) Applicants: Hyundai Motor Company, Seoul (KR); Kia Motors Corporation, Seoul (KR)

(72) Inventors: Joonyoung Park, Seoul (KR); In Eok Cho, Incheon (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 132 days.

(21) Appl. No.: 14/921,814

(22) Filed: Oct. 23, 2015

(65) Prior Publication Data

US 2017/0050630 A1 Feb. 23, 2017

(30) Foreign Application Priority Data

Aug. 17, 2015 (KR) .......................... 10-2015-0115369

(51) Int. Cl.
| | | |
|---|---|---|
| *B60L 9/00* | (2006.01) | |
| *B60L 11/00* | (2006.01) | |
| *G05D 1/00* | (2006.01) | |
| *B60W 20/10* | (2016.01) | |
| *B60W 10/04* | (2006.01) | |

(52) U.S. Cl.
CPC ............ *B60W 20/10* (2013.01); *B60W 10/04* (2013.01); *B60W 2510/1025* (2013.01); *B60W 2710/105* (2013.01); *Y10S 903/945* (2013.01)

(58) Field of Classification Search
CPC ...... B60W 10/06; B60W 20/10; B60W 10/04; F02D 29/02
USPC .............................................. 701/22
See application file for complete search history.

(56) References Cited

U.S. PATENT DOCUMENTS

| | | | |
|---|---|---|---|
| 2013/0166118 A1* | 6/2013 | Kim ...................... | B60W 10/06 701/22 |
| 2013/0304295 A1* | 11/2013 | Tagawa ................. | B60K 6/445 701/22 |
| 2015/0275787 A1* | 10/2015 | Dufford ................. | F02D 29/02 701/102 |

FOREIGN PATENT DOCUMENTS

| | | |
|---|---|---|
| JP | 2000-205000 A | 7/2000 |
| JP | 2010-234873 A | 10/2010 |
| JP | 2011-084137 A | 4/2011 |

* cited by examiner

*Primary Examiner* — Isaac Smith
(74) *Attorney, Agent, or Firm* — Mintz Levin Cohn Ferris Glovsky and Popeo, P.C.; Peter F. Corless

(57) ABSTRACT

A method and an apparatus for controlling engine start for a hybrid electric vehicle are provided. The apparatus includes a data detector that is configured to detect data for controlling start of an engine. Additionally, a controller is configured to calculate a demand power of a driver based on the data and start the engine when the demand power of the driver is greater than an engine-on power line which is a reference for starting the engine.

32 Claims, 4 Drawing Sheets

METHOD AND APPARATUS FOR CONTROLLING ENGINE START FOR HYBRID ELECTRIC VEHICLE

CROSS-REFERENCE TO RELATED APPLICATION

This application claims priority to and the benefit of Korean Patent Application No. 10-2015-0115369 filed in the Korean Intellectual Property Office on Aug. 17, 2015, the entire contents of which are incorporated herein by reference.

BACKGROUND (a) Field of the Invention

The present invention relates to a hybrid electric vehicle, and more particularly, to a method and an apparatus for controlling engine start for a hybrid electric vehicle.

(b) Description of the Related Art

As is generally known in the art, a hybrid electric vehicle uses an internal combustion engine and a battery power source together. Particularly, the hybrid electric vehicle efficiently combines the torque from the internal combustion engine and torque from the motor. In general, a hybrid electric vehicle includes an engine, a motor, an engine clutch that selectively connects the engine to the motor, a transmission, a differential gear device, a battery, a hybrid starter & generator (HSG) configured to start the engine or generate power based on output of the engine, and a plurality of wheels. The HSG may refer to an integrated starter & generator (ISG).

Additionally, a hybrid electric vehicle enables driving in an electric vehicle (EV) mode, in which torque of the motor is used; a hybrid electric vehicle (HEV) mode, in which torque of the engine is used as main torque and torque of the motor is used as auxiliary torque; and a regenerative braking mode, in which braking and inertial energy are recovered through electrical power generation of the motor while braking of the vehicle or while driving of the vehicle by inertia to be charged in the battery. The EV mode and the HEV mode are enabled by engaging or releasing the engine clutch based on a manipulation (e.g., engagement) of an accelerator pedal or brake pedal by a driver, a vehicle speed, a state of charge (SOC) of the battery, and the like.

By using both mechanical energy of the engine and electrical energy of the battery, using optimal operation regions of the engine and the motor, and recovering the energy upon braking, fuel efficiency in a hybrid electric vehicle may be improved and the energy of the hybrid electric vehicle may be efficiently used.

When the hybrid electric vehicle starts from a stopped state, the hybrid electric vehicle generally runs using electrical energy of the battery. At the time of starting (e.g., launching from a stopped state), the hybrid electric vehicle may determine whether to start the engine in consideration of energy efficiency of the engine and energy efficiency of the motor. For example, the engine may be started when a demand power of a driver is greater than a predetermined power. The engine of the hybrid electric vehicle may be frequently started and stopped in a specific traveling status (e.g., a congested road and a parking lot) based on the demand power of the driver. Accordingly, energy efficiency of the hybrid electric vehicle may be deteriorated due to unnecessary fuel consumption.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a method and an apparatus for controlling engine start of a hybrid electric vehicle having advantages of improving energy efficiency of the hybrid electric vehicle by preventing an engine from unnecessarily starting.

A method for controlling engine start of a hybrid electric vehicle according to a first exemplary embodiment of the present invention may include: calculating a demand power of a driver; comparing the demand power with a first reference power; calculating an elapsed time from a time at which the demand power of the driver exceeds the first reference power to a time at which the demand power of the driver becomes equal to or less than the first reference power; increasing a counter value when the elapsed time is equal to or less than a first reference speed; comparing the counter value with a threshold value; and setting an engine-on power line, which is a reference for starting an engine, as a second reference power when the counter value is greater than or equal to the threshold value, wherein the second reference power is greater than the first reference power.

The demand power of the driver may be calculated by multiplying the vehicle speed by a demand torque of the driver and the demand torque of the driver may be calculated based on a position (e.g., engagement degree) of an accelerator pedal, the vehicle speed, and a gear step. The method may further include setting the engine-on power line as the first reference power when the counter value is less than the threshold value.

The increasing of the counter value may include determining whether to increase the counter value while further considering a gear step. Additionally, the method may include setting the engine-on power line as the first reference power when the elapsed time is greater than a second reference time. The counter value may be reset to zero when the elapsed time is greater than the second reference time.

The engine-on power line may be set as the first reference power when the vehicle speed is greater than a second reference speed. Additionally, the counter value may be reset to zero when the vehicle speed is greater than the second reference speed. The method may further include starting the engine when the demand power of the driver is greater than the engine-on power line when the engine is stopped.

Further, a method for controlling engine start of a hybrid electric vehicle according to a second exemplary embodiment of the present invention may include: calculating a demand torque of a driver; comparing the demand torque of the driver with a first reference torque; calculating an elapsed time from a time at which the demand torque of the driver is greater than the first reference torque to a time at which the demand torque of the driver becomes equal to or less than the first reference torque; increasing a counter value when the elapsed time is equal to or less than a first reference time and a vehicle speed is equal to or less than a first reference speed; comparing the counter value with a threshold value; and setting an engine-on torque line, which is a reference for starting an engine, as a second reference torque when the counter value is equal to or greater than the threshold value, wherein the second reference torque is greater than the first reference torque.

The demand torque of the driver may be calculated based on a position (e.g., engagement degree) of an accelerator pedal, the vehicle speed, and a gear step. The method may further include setting the engine-on torque line as the first reference torque when the counter value is less than the threshold value. The increasing of the counter value may include determining whether to increase the counter value while further considering a gear step. The engine-on torque line may further be reset as the first reference torque when the elapsed time is greater than a second reference time.

Additionally, the method may further include resetting the counter value to zero when the elapsed time is greater than the second reference time. The engine-on torque line may be set as the first reference torque when the vehicle speed is greater than a second reference speed and the counter value may be reset to zero when the vehicle speed is greater than the second reference speed. The method may further include starting the engine when the demand torque of the driver is greater than the engine-on torque line when the engine is stopped.

An apparatus for controlling engine start of a hybrid electric vehicle according to the first exemplary embodiment of the present invention may include: a data detector configured to detect data for controlling start of an engine; and a controller configured to calculate a demand power of a driver based on the data, and start the engine when the demand power of the driver is greater than an engine-on power line which is a reference for starting the engine. The controller may further be configured to compare the demand power of the driver with a first reference power, calculate an elapsed time from a time at which the demand power of the driver is greater than the first reference power to a time at which the demand power of the driver becomes equal to or less than the first reference power, increase a counter value when the elapsed time is equal to or less than a first reference time and a vehicle speed is equal to or less than a first reference speed, and set the engine-on power line as a second reference power when the counter value is greater than a threshold value, and wherein the second reference power is greater than the first reference power.

The controller may further be configured to calculate a demand torque of a driver based on a position of an accelerator pedal, the vehicle speed, and a gear step, and calculate the demand power of the driver by multiplying the vehicle speed by the demand torque of the driver. The controller may be configured to set the engine-on power line as the first reference power when the counter value is less than the threshold value and determine whether to increase the counter value while further considering a gear step. The controller may also be configured to set the engine-on power line as the first reference power when the elapsed time is greater than a second reference time.

Furthermore, the controller may be configured to reset the counter value to zero when the elapsed time is greater than the second reference time and set the engine-on power line as the first reference power when the vehicle speed is greater than a second reference speed. The counter value may be reset to zero when the vehicle speed is greater than the second reference speed. The data detector may include an accelerator pedal position detector configured to detect a position of an accelerator pedal (e.g., detect an engagement degree); a vehicle speed detector configured to detect the vehicle speed; and a gear step detector configured to detect a gear step (e.g., a gear position).

An apparatus for controlling engine start of a hybrid electric vehicle according to the second exemplary embodiment of the present invention may include: a data detector configured to detect data for controlling start of an engine; and a controller configured to calculate a demand torque of a driver based on the data, and start the engine when the demand torque of the driver is greater than an engine-on torque line which is a reference for starting the engine.

The controller may further be configured to compare the demand torque of the driver with a first reference torque, calculate an elapsed time from a time at which the demand torque of the driver is greater than the first reference torque to a time at which the demand torque of the driver becomes equal to or less than the first reference torque, increase a counter value when the elapsed time is equal to or less than a first reference time and a vehicle speed is equal to or less than a first reference speed, and set the engine-on torque line as a second reference torque when the counter value is greater than a threshold value, and wherein the second reference torque is greater than the first reference torque.

Additionally, the controller may be configured to calculate the demand torque based on a position of an accelerator pedal, the vehicle speed, and a gear step and set the engine-on torque line as the first reference torque when the counter value is less than the threshold value. The controller may further be configured to determine whether to increase the counter value while further considering a gear step and set the engine-on torque line as the first reference torque when the elapsed time is greater than a second reference time.

The controller may be configured to reset the counter value to zero when the elapsed time is greater than the second reference time and set the engine-on torque line as the first reference torque when the vehicle speed is greater than a second reference speed. The counter value may be reset to zero when the vehicle speed is greater than the second reference speed. The data detector may include an accelerator pedal detector configured to detect a position of an accelerator pedal; a vehicle speed detector configured to detect the vehicle speed; and a gear step detector configured to detect a gear step.

As described above, according to exemplary embodiments of the present invention, it may be possible to prevent the engine from unnecessarily starting, thereby improving energy efficiency of the hybrid electric vehicle.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DESCRIPTION OF SYMBOLS

Figure 1:
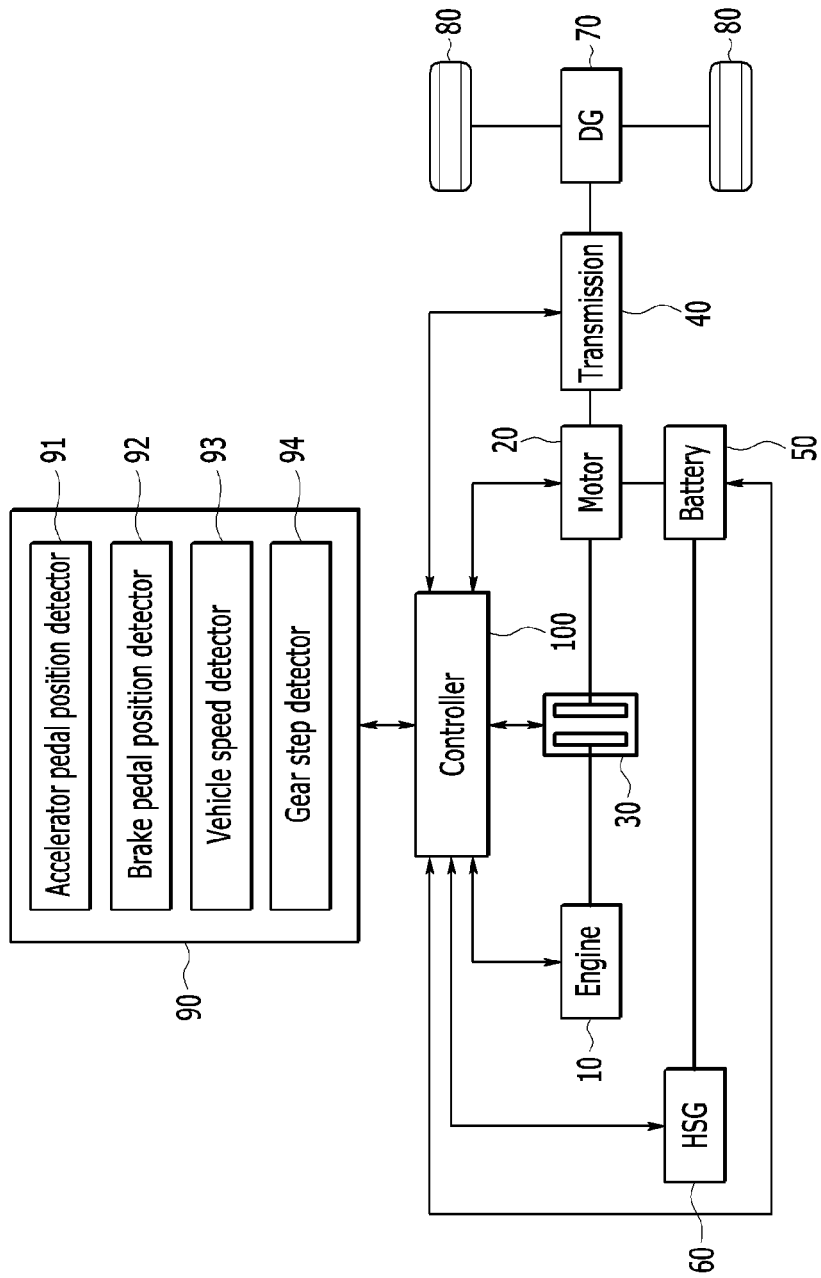
FIG. 1 is a diagram of a hybrid electric vehicle according to an exemplary embodiment of the present invention.

10: engine
20: motor
30: engine clutch
40: transmission
50: battery 60: HSG
70: differential gear device
80: wheel
90: data detector
100: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention. In addition, since each component shown in the drawings is arbitrarily illustrated for easy description, the present invention is not particularly limited to the components illustrated in the drawings.

FIG. 1 is a block diagram of a hybrid electric vehicle according to an exemplary embodiment of the present invention. As shown in FIG. 1, a hybrid electric vehicle according to an exemplary embodiment of the present invention may include an engine 10, a motor 20, an engine clutch 30 that selectively connects the engine 10 to the motor 20, a transmission 40, a battery 50, a hybrid starter & generator (HSG) 60, a differential gear device 70, a wheel 80, a data detector 90, and a controller 100. The controller 100 may be configured to operate the various components of the hybrid electric vehicle.

In particular, the engine 10 may be configured to combust a fuel to generate torque, and various engines such as a gasoline engine, a diesel engine, and a liquefied petroleum gas injection (LPI) engine may be used as the engine 10. In connection with torque transmission of the hybrid electric vehicle, torque generated from the engine 10 and/or the motor may be selectively transmitted to an input shaft of the transmission 40, and torque output from the output shaft of the transmission 40 may be transmitted to an axle via the differential gear device 70. The axle may be configured to rotate the wheel 80 such that the hybrid electric vehicle runs by the torque generated from the engine 10 and/or the motor 20.

The battery 50 may be configured to supply electricity to the motor 20 in an electric vehicle (EV) mode and a hybrid electric vehicle (HEV) mode, and may be charged with electricity recovered using the motor 20 in a regenerative braking mode. The HSG 60 may be configured to start the engine 10 or generate electricity based on an output of the engine 10. The engine clutch 30 may be disposed between the engine 10 and the motor 20. An input shaft of the engine clutch 30 may be connected to the engine 10, and an output shaft of the engine clutch 30 may be connected to the motor 20.

The data detector 90 may be configured to detect or collect data for controlling engine start of the hybrid electric vehicle, and the data detected by the data detector 90 may be transmitted to the controller 100. The data detector 90 may include an accelerator pedal position detector (e.g., sensor) 91, a brake pedal position detector (e.g., sensor) 92, a vehicle speed detector (e.g., sensor) 93, and a gear step detector (e.g., position sensor) 94.

The accelerator pedal position detector 91 may be configured to detect or sense a position of an accelerator pedal (e.g., an engagement degree of the accelerator pedal or the amount of pressure exerted onto the pedal), and transmit a signal that corresponds thereto to the controller 100. When the accelerator pedal is completely engaged, the position of the accelerator pedal is 100%, and when the accelerator pedal is disengaged (e.g., no pressure is exerted onto the pedal), the position of the accelerator pedal is 0%. The brake pedal position detector 92 may be configured to detect or sense a position of a brake pedal (e.g., engagement degree of the brake pedal or the amount of pressure exerted onto the pedal), and transmit a signal that corresponds thereto to the controller 100. When the brake pedal is completely engaged, the position of the brake pedal is 100%, and when the brake pedal is disengaged, the position of the brake pedal is 0%.

The vehicle speed detector 93 may be configured to detect or sense a vehicle speed and transmit a corresponding signal to the controller 100. The gear step detector 94 may be configured to detect a gear step (e.g., a gear position or state) that is currently engaged, and transmit a corresponding signal to the controller. In particular, the gear step may be detected when a ratio of an input speed and an output speed of the transmission 40 is detected. In addition, the gear step may be detected from currently operated friction elements or the vehicle speed and a position of the accelerator pedal. For example, gear steps which may be engaged may be first, second, third, fourth, fifth, and sixth gear steps and a reverse gear step in a six-speeds transmission.

The controller 100 may be implemented with one or more microprocessors executed by a predetermined program. The predetermined program may include a series of commands for performing each step included in a method for controlling engine start for a hybrid electric vehicle according to an exemplary embodiment of the present invention.

Furthermore, the controller 100 may be configured to determine whether to start the engine 10 based on the data detected by the data detector 90. In particular, the controller 100 may be configured to determine whether to start the engine using an engine-on power line or an engine-on torque line which is a reference for starting the engine 10. The controller 100 may be configured to start the engine 10 when a demand power of a driver is greater than the engine-on power line or a demand torque of the driver is greater than the engine-on torque line.

Figure 2:
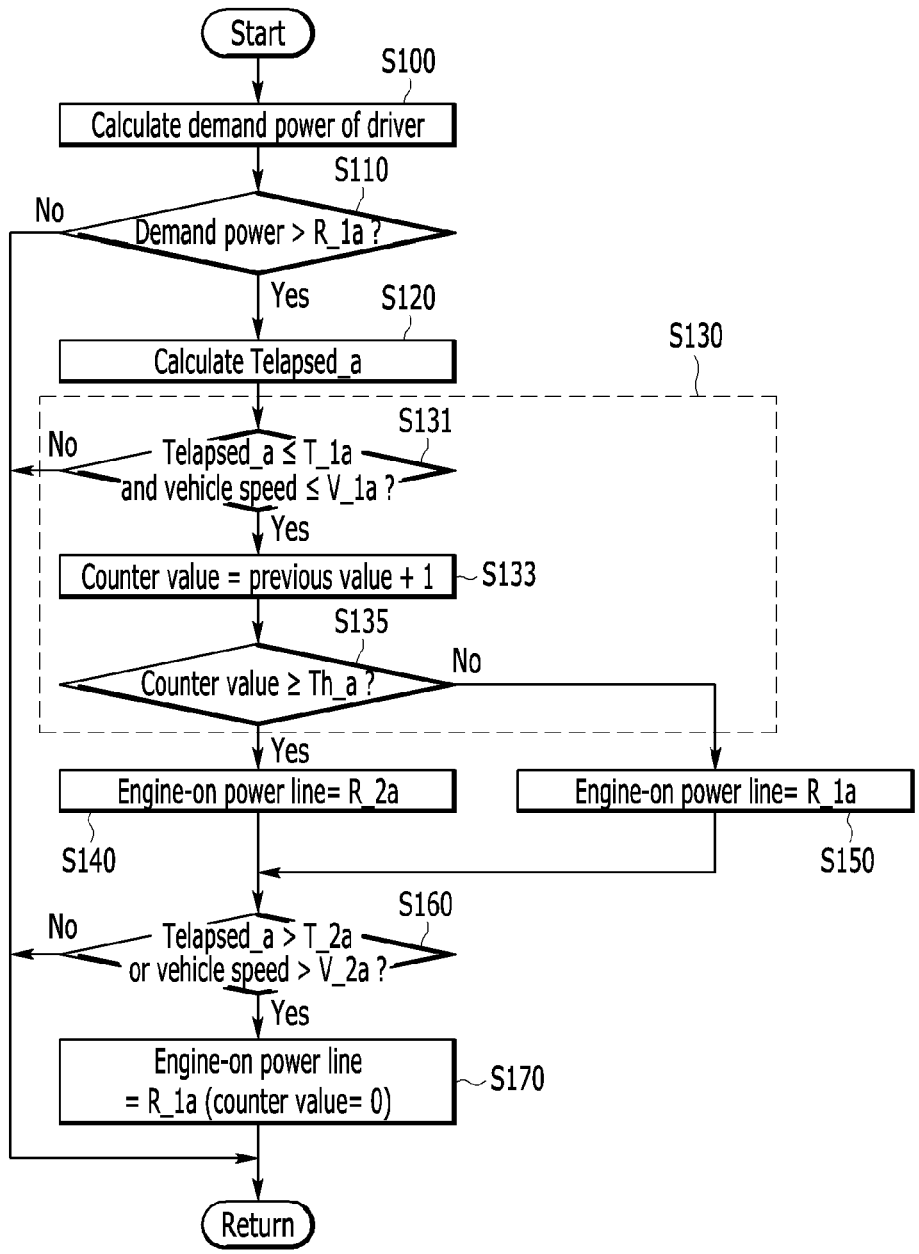
FIG. 2 is a flowchart of a method for controlling engine start of a hybrid electric vehicle according to a first exemplary embodiment of the present invention.

Hereinafter, a method for controlling engine start for a hybrid vehicle according to a first exemplary embodiment of the present invention will be described in detail with reference to FIG. 2 and FIG. 3. In particular, the methods described herein below may be executed by the controller. FIG. 2 is a flowchart of the method for controlling engine start for the hybrid electric vehicle according to the first exemplary embodiment of the present invention, and FIG. 3 is a graph illustrating the method for controlling engine start for the hybrid electric vehicle according to the first exemplary embodiment of the present invention.

Figure 3:
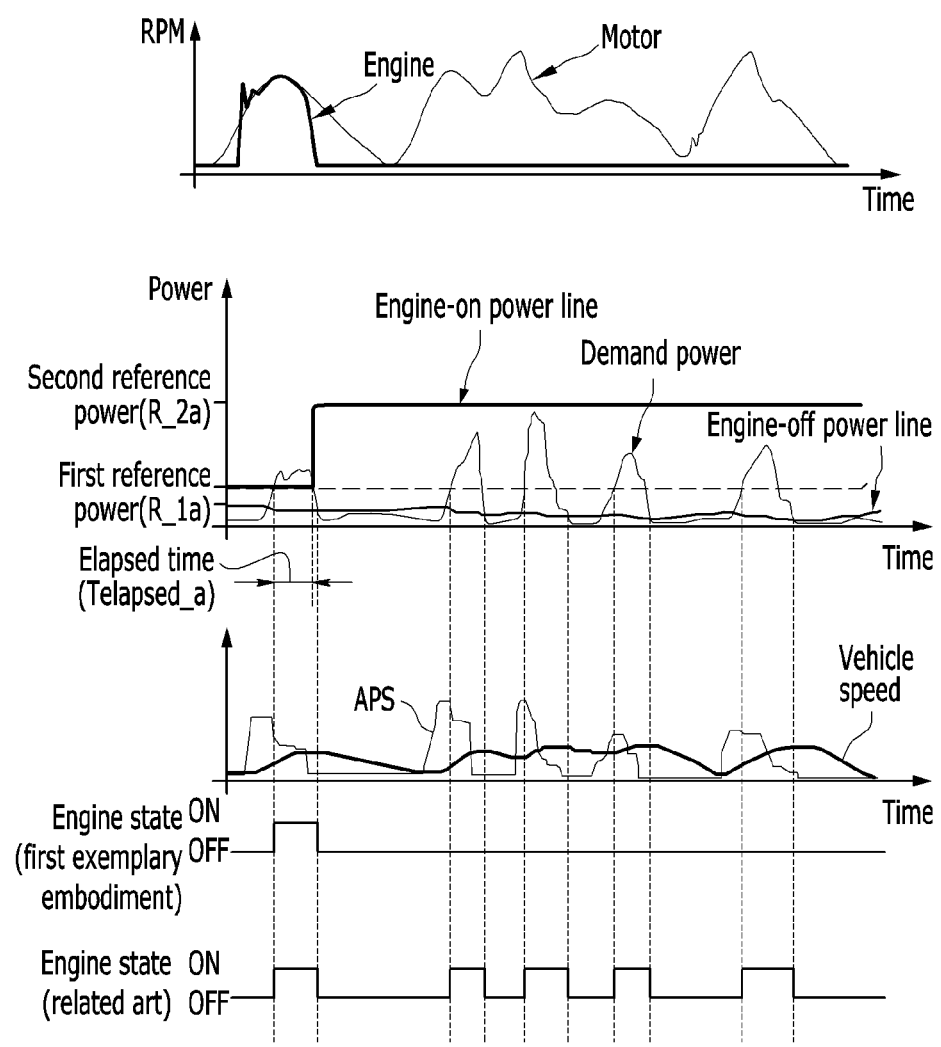
FIG. 3 is a graph illustrating the method for controlling engine start for the hybrid electric vehicle according to the first exemplary embodiment of the present invention.

Referring to FIG. 2 and FIG. 3, the method for controlling engine start for the hybrid vehicle according to the first exemplary embodiment of the present invention may begin with calculating the demand power of the driver in step S100. The controller 100 may be configured to calculate a demand torque of the driver based on the position of the accelerator pedal, the vehicle speed, and the gear step. The demand power of the driver may be calculated by multiplying the vehicle speed by the demand torque of the driver.

Further, the controller 100 may be configured to compare the demand power of the driver with a first reference power $R\_1a$ in step S110. The first reference power $R\_1a$ may be a default value of the engine-on power line, and may be set to a value determined by a person of ordinary skill in the art in consideration of energy efficiency of the engine 10 and energy efficiency of the motor 20.

When the demand power of the driver is equal to or less than the first reference power $R\_1a$ in step S110, the controller 100 may complete the method for controlling engine start of the hybrid electric vehicle according to the first exemplary embodiment of the present invention. When the demand power of the driver is greater than the first reference power $R\_1a$ in step S110, the controller 100 may be configured to calculate an elapsed time Telapsed_a from a time at which the demand power of the driver exceeds the first reference power $R\_1a$ to a time at which the demand power of the driver becomes equal to or less than the first reference power $R\_1a$ in step S120.

The controller 100 may then be configured to determine whether a first predetermined condition of the engine-on power line is satisfied based on the elapsed time Telapsed_a and the vehicle speed in step S130. When the first predetermined condition is satisfied, the controller 100 may be configured to set the engine-on power line as a second reference power $R\_2a$. In particular, the controller 100 may be configured to determine whether the elapsed time Telapsed_a is equal to or less than a first reference time $T\_1a$ and the vehicle speed is equal to or less than a first reference speed $V\_1a$ in step S131, which is the first predetermined condition.

When the elapsed time Telapsed_a is greater than the first reference time $T\_1a$ or the vehicle speed is greater than the first reference speed $V\_1a$ in step S131, the controller 100 may complete the method for controlling engine start for the hybrid vehicle according to the first exemplary embodiment of the present invention. When the elapsed time Telapsed_a is equal to or less than the first reference time $T\_1a$ and the vehicle speed is equal to or less than the first reference speed $V\_1a$ in step S131, the controller 100 may be configured to increase a counter value by 1 in step S133.

The controller 100 may further be configured to compare the counter value with a threshold value Th_a in step S135. The first reference time $T\_1a$, the first reference speed $V\_1a$, and the threshold value Th_a may be set to values determined by a person of ordinary skill in the art to determine whether the hybrid electric vehicle travels in a congested road or a parking lot. When the counter value is equal to or greater than the threshold value Th_a in step S135, the controller 100 may be configured to set the engine-on power line as a second reference power $R\_2a$ in step S140. The second reference power $R\_2a$ may be greater than the first reference power $R\_1a$, and may be set to a value determined by a person of ordinary skill in the art in consideration of energy efficiency of the engine 10 and energy efficiency of the motor 20.

When the counter value is equal to or greater than the threshold value Th_a, the controller 100 may be configured to determine that the hybrid vehicle travels in a congested road or a parking lot. When the engine-on power line is set as the first reference power $R\_1a$, the controller 100 may be configured to change the engine-on power line to the second reference power $R\_2a$, and when the engine-on power line is set as the second reference power $R\_2a$, the controller 100 may be configured to maintain the engine-on power line as the second reference power $R\_2a$. Accordingly, it may be possible to prevent the engine 10 from unnecessarily starting by setting the engine-on power line as the second reference power $R\_2a$. When the counter value is less than the threshold value Th_a in step S135, the controller 100 may be configured to set the engine-on power line as the first reference power $R\_1a$ in step S150. In other words, the engine-on power line may be maintained as the default value.

Alternatively, the controller 100 may be configured to determine whether to increase the counter value further considering the gear step currently engaged in step S133. In other words, when the elapsed time Telapsed_a is equal to or less than the first reference time $T\_1a$, the vehicle speed is equal to or less than the first reference speed $V\_1a$, and the gear step is within a predetermined gear step range, the controller 100 may be configured to increase the counter value by 1. The predetermined gear step range may include the first gear step and the reverse gear step. The predetermined gear step range may further include the second gear step. In the case of considering the gear step, the controller 100 may be configured to more accurately determine whether the hybrid electric vehicle travels in the congested road or the parking lot.

In addition, the controller 100 may be configured to determine whether a second predetermined condition of the engine-on power line is satisfied based on the elapsed time Telapsed_a and the vehicle speed in step S160. When the second predetermined condition is satisfied, the controller 100 may be configured to set the engine-on power line as the first reference power R_1a. Steps S130 and S160 may be separately performed regardless of the sequence. In particular, the controller 100 may be configured to determine whether the elapsed time Telapsed_a is greater than a second reference time T_2a or the vehicle speed is greater than a second reference speed V_2a as the second predetermined condition to be satisfied. The second reference time T_2a may be equal to or greater than the first reference time T_1a, and the second reference speed V_2a may be equal to or greater than the first reference speed V_1a.

When the elapsed time Telapsed_a is greater than the second reference time T_2a or the vehicle speed is greater than the second reference speed V_2a at step S160, the controller 100 may be configured to set the engine-on power line as the first reference power R_1a in step S170. In other words, when the engine-on power line is set as the second reference power R_2a, the controller 100 may be configured to change the engine-on power line to the first reference power R_1a, and when the engine-on power line is set as the first reference power R_1a, the controller 100 may be configured to maintain the engine-on power line as the first reference power R_1a. In particular, the controller 100 may be configured to reset the counter value to zero.

When the elapsed time Telapsed_a is equal to or less than the second reference time T_2a and the vehicle speed is equal to or less than the second reference speed V_2a, the controller 100 may complete the method for controlling engine start of the hybrid electric vehicle according to the first exemplary embodiment of the present invention.

Meanwhile, while steps S100 to S170 are performed, the controller 100 may be configured to determine whether to start the engine 10 using the engine-on power line. When the engine 10 is stopped, the controller 100 may be configured to start the engine 10 when the demand power of the driver is greater than the engine-on power line. In other words, when the engine-on power line is set as the first reference power R_1a, the engine 10 may be started when the demand power of the driver is greater than the first reference power R_1a. When the engine-on power line is set as the second reference power R_2a, the engine 10 may be started when the demand power of the driver is greater than the second reference power R_2a.

Hereinafter, a method for controlling engine start of a hybrid electric vehicle according to a second exemplary embodiment of the present invention will be described in detail with reference to FIG. 4.

Figure 4:
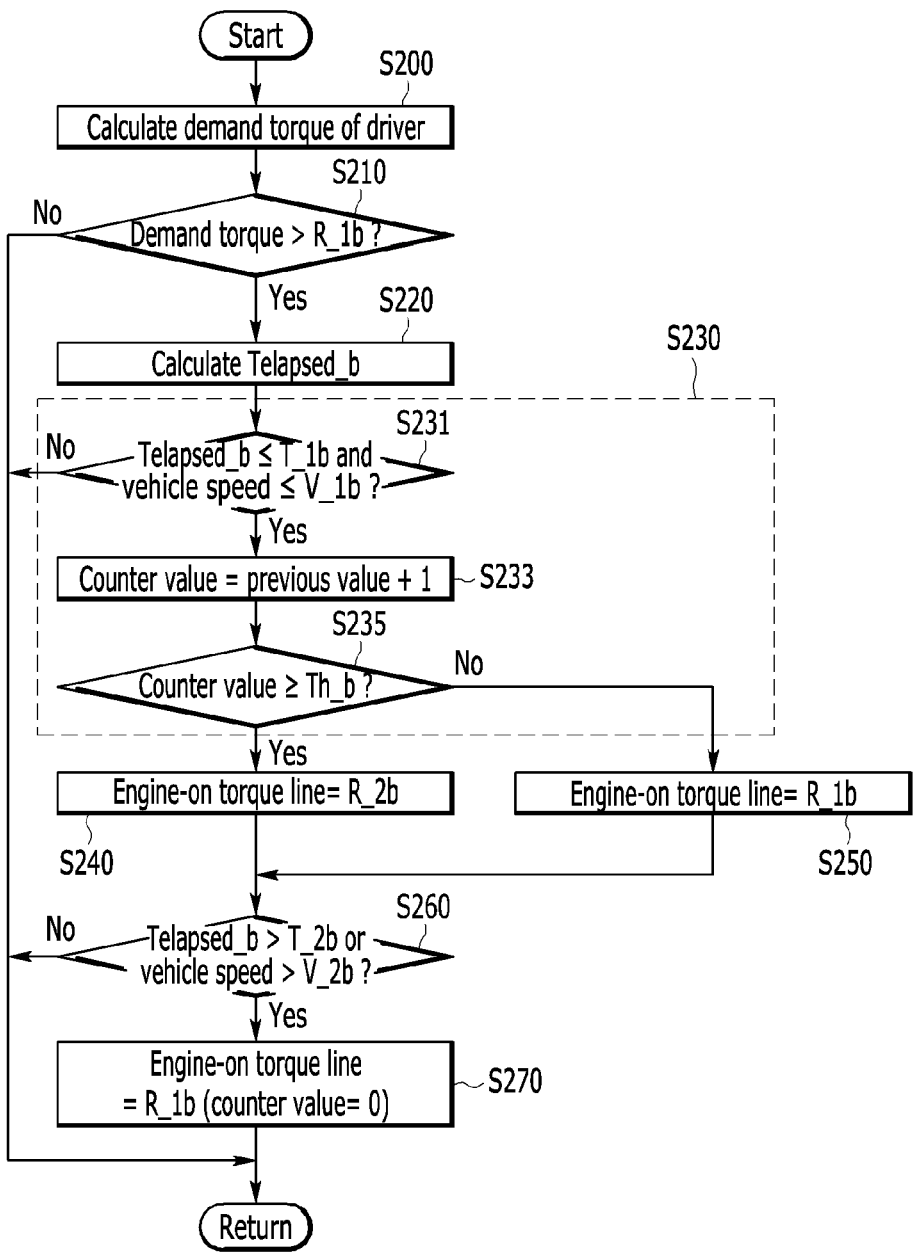
FIG. 4 is a flowchart of a method for controlling engine start of a hybrid electric vehicle according to a second exemplary embodiment of the present invention.

FIG. 4 is a flowchart of the method for controlling engine start for the hybrid vehicle electric vehicle according to the second exemplary embodiment of the present invention. Referring FIG. 4, the method for controlling engine start for the hybrid electric vehicle according to the second exemplary embodiment of the present invention is similar to the method for controlling engine start for the hybrid electric vehicle according to the first exemplary embodiment of the present invention, except that the demand torque of the driver is used instead of the demand power of the driver.

Referring to FIG. 4, the method for controlling engine start for the hybrid electric vehicle according to the second exemplary embodiment of the present invention begins with calculating the demand torque of the driver in step S200. The controller 100 may be configured to calculate the demand torque of the driver based on the position of the accelerator pedal, the vehicle speed, and the gear step.

Further, the controller 100 may be configured to compare the demand torque of the driver with a first reference torque R_1b in step S210. The first reference torque R_1b may be a default value of the engine-on torque line, and may be set to a value determined by a person of ordinary skill in the art in consideration of the energy efficiency of the engine 10 and the energy efficiency of the motor 20.

When the demand torque of the driver is equal to or less than the first reference torque R_1b in step S210, the controller 100 may complete the method for controlling engine start of the hybrid electric vehicle according to the second exemplary embodiment of the present invention. When the demand torque of the driver is greater than the first reference torque R_1b in step S210, the controller 100 may be configured to calculate an elapsed time Telapsed_b from a time at which the demand torque of the driver is greater than the first reference torque R_1b to a time at which the demand torque of the driver becomes equal to or less than the first reference torque R_1b in step S220.

The controller 100 may further be configured to determine whether a first predetermined condition of the engine-on torque line is satisfied based on the elapsed time Telapsed_b and the vehicle speed in step S230. When the first predetermined condition is satisfied, the controller 100 may be configured to set the engine-on torque line as a second reference torque R_2b. In particular, the controller 100 may be configured to determine whether the elapsed time Telapsed_b is equal to or less than a first reference time T_1b and the vehicle speed is equal to or less than a first reference speed V_1b in step S231 as the first predetermined condition to be satisfied.

When the elapsed time Telapsed_b is greater than the first reference time T_1b or the vehicle speed is greater than the first reference speed V_1b in step S231, the controller 100 may complete the method for controlling engine start for the hybrid vehicle according to the second exemplary embodiment of the present invention. When the elapsed time Telapsed_b is equal to or less than the first reference time T_1b and the vehicle speed is equal to or less than the first reference speed V_1b in step S231, the controller 100 may be configured to increase a counter value by 1 in step S233. The controller 100 may then be configured to compare the counter value with a threshold value Th_b in step S235. The first reference time T_1b, the first reference speed V_1b, and the threshold value Th_b may be set to values determined by a person of ordinary skill in the art to determine whether the hybrid electric vehicle travels in a congested road or a parking lot.

When the counter value is equal to or greater than the threshold value Th_b in step S235, the controller 100 may be configured to set the engine-on power line as a second reference torque R_2b in step S240. The second reference torque R_2b may be greater than the first reference torque R_1b, and may be set to a value which is determined by a person of ordinary skill in the art in consideration of energy efficiency of the engine 10 and energy efficiency of the motor 20. When the counter value is equal to or greater than the threshold value Th_b, the controller 100 may be configured to determine that the hybrid electric vehicle is traveling in the congested road or the parking lot.

When the engine-on torque line is set as the first reference torque R_1b, the controller 100 may be configured to change the engine-on torque line to the second reference torque R_2b, and when the engine-on torque line is set as the second reference torque R_2b, the controller 100 may be configured to maintain the engine-on torque line as the second reference torque R_2b. Accordingly, it may be possible to prevent the engine 10 from unnecessarily starting by setting the engine-on torque line as the second reference torque R_2b. When the counter value is less than the threshold value Th_b in step S235, the controller 100 may be configured to set the engine-on torque line as the first reference torque R_1b in step S250. In other words, the engine-on torque line may be maintained as the default value.

Alternatively, the controller 100 may be configured to determine whether to increase the counter value further considering the gear step currently engaged in step S233. In other words, when the elapsed time Telapsed_b is equal to or less than the first reference time T_1b, the vehicle speed is equal to or less than the first reference speed V_1b, and the gear step is within a predetermined gear step range, the controller 100 may be configured to increase the counter value by 1. The predetermined gear step range may include the first gear step and the reverse gear step. The predetermined gear step range may further include the second gear step. In the case of considering the gear step, the controller 100 may be configured to more accurately determine whether the hybrid electric vehicle is traveling in the congested road or the parking lot.

Furthermore, the controller 100 may be configured to determine whether a second predetermined condition of the engine-on torque line is satisfied based on the elapsed time Telapsed_b and the vehicle speed in step S260. When the second predetermined condition is satisfied, the controller 100 may be configured to set the engine-on torque line as the first reference torque R_1b. Steps S230 to S260 may be separately performed regardless of the sequence. In particular, the controller 100 may be configured to determine whether the elapsed time Telapsed_b is greater than a second reference time T_2b or the vehicle speed is greater than a second reference speed V_2b. The second reference time T_2b may be equal to or greater than the first reference time T_1b, and the second reference speed V_2b may be equal to or greater than the first reference speed V_1b.

When the elapsed time Telapsed_b is greater than the second reference time T_2b or the vehicle speed is greater than the second reference speed V_2b in step S260, the controller 100 may be configured to set the engine-on torque line as the first reference torque R_1b in step S270. In other words, when the engine-on torque line is set as the second reference torque R_2b, the controller 100 may be configured to change the engine-on torque line to the first reference torque R_1b, and when the engine-on torque line is set as the first reference torque R_1b, the controller 100 may be configured to maintain the engine-on torque line as the first reference torque R_1b. In particular, the controller 100 may be configured to reset the counter value to zero.

When the elapsed time Telapsed_b is equal to or less than the second reference time T_2b and the vehicle speed is equal to or less than the second reference speed V_2b, the controller 100 may complete the method for controlling engine start of the hybrid electric vehicle according to the second exemplary embodiment of the present invention.

Meanwhile, while steps S200 to S270 are performed, the controller 100 may be configured to determine whether to start the engine 10 using the engine-on torque line. When the engine 10 is stopped, the controller 100 may be configured to start the engine 10 when the demand torque of the driver is greater than the engine-on torque line. In other words, when the engine-on torque line is set as the first reference torque R_1b, the engine 10 may be started when the demand torque of the driver is greater than the first reference torque R_1b. When the engine-on torque line is set as the second reference torque R_2b, the engine 10 may be started when the demand torque of the driver is greater than the second reference torque R_2b.

According to the exemplary embodiments of the present invention, it may be possible to prevent the engine 10 from unnecessarily starting, thereby improving energy efficiency of the hybrid electric vehicle.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling engine start of a vehicle, comprising:
   calculating, by a controller, a driver demand torque based on a position of an accelerator pedal, a vehicle speed, and a gear step;
   calculating, by the controller, a driver demand power by multiplying the vehicle seed by the driver demand torque;
   comparing, by the controller, the driver demand power with a first reference power;
   calculating, by the controller, an elapsed time from a time at which the driver demand power is greater than the first reference power to a time at which the driver demand power becomes equal to or less than the first reference power;
   increasing, by the controller, a counter value when the elapsed time is equal to or less than a first reference time and the vehicle speed is equal to or less than a first reference speed;
   comparing, by the controller, the counter value with a threshold value; and
   setting, by the controller, an engine-on power line, which is a reference for starting an engine, as a second reference power when the counter value is equal to or greater than the threshold value,
   wherein the second reference power is greater than the first reference power.

2. The method of claim 1, further comprising:
   setting, by the controller, the engine-on power line as the first reference power when the counter value is less than the threshold value.

3. The method of claim 1, wherein the counter value is increased when the elapsed time is equal to or less than the first reference time, the vehicle speed is equal to or less than the first reference speed, and the gear step is within a predetermined gear step range.

4. The method of claim 1, further comprising:
   changing, by the controller, the engine-on power line to the first reference power when the elapsed time is greater than a second reference time and the engine-on power line is set as the second reference power; and
   maintaining, by the controller, the engine-on power line as the first reference power when the elapsed time is greater than the second reference time and the engine-on power line is set as the first reference power,
   wherein the second reference time is equal to or greater than the first reference time.

5. The method of claim 4, further comprising:
   resetting, by the controller, the counter value to zero when the elapsed time is greater than the second reference time.

6. The method of claim 1, further comprising:
changing, by the controller, the engine-on power line to the first reference power when the vehicle speed is greater than a second reference speed and the engine-on power line is set as the second reference power; and
maintaining, by the controller, the engine-on power line as the lint reference power when the vehicle speed is greater than the second reference speed and the engine-on power line is set as the first reference power,
wherein the second reference speed is equal to or greater than the first reference speed.

7. The method of claim 6, further comprising:
resetting, by the controller, the counter value to zero when the vehicle speed is greater than the second reference speed.

8. The method of claim 1, further comprising:
starting, by the controller, the engine when the driver demand power is greater than the engine-on power line when the engine is stopped.

9. A method for controlling engine start of a vehicle, comprising:
calculating, by the controller, a driver demand torque based on a position of an accelerator pedal, the vehicle speed, and a gear step;
comparing, by the controller, the driver demand torque with a first reference torque;
calculating, by the controller, an elapsed time from a time at which the driver demand torque is greater than the first reference torque to a time at which the demand torque becomes equal to or less than the first reference torque;
increasing, by the controller, a counter value when the elapsed time is equal to or less than a first reference time and a vehicle speed is equal to or less than a first reference speed;
comparing, by the controller, the counter value with a threshold value; and
setting, by the controller, an engine-on torque line, which is a reference for starting an engine, as a second reference torque when the counter value is equal to or greater than the threshold value,
wherein the second reference torque is greater than the first reference torque.

10. The method of claim 9, wherein further comprising:
setting, by the controller, the engine-on torque line as the first reference torque when the counter value is less than the threshold value.

11. The method of claim 9, wherein the counter value is increased when the elapsed time is equal to or less than the first reference time, the vehicle speed is equal to or less than the first reference speed, and the gear step is within a predetermined gear step range.

12. The method of claim 9, further comprising:
change, by the controller, the engine-on torque line to the first reference torque when the elapsed time is greater than a second reference time and the engine-on torque line is set as the second reference torque; and
maintain the engine-on torque line as the first reference torque when the elapsed time is greater than the second reference time and the engine-on torque line is set as the first reference torque,
wherein the second reference time is equal to or greater than the first reference time.

13. The method of claim 12, further comprising:
resetting, by the controller, the counter value to zero when the elapsed time is greater than the second reference time.

14. The method of claim 9, further comprising:
changing, by the controller, the engine-on torque line to the first reference torque when the vehicle speed is greater than a second reference speed and the engine-on torque line is set as the second reference torque; and
maintaining, by the controller, the engine-on torque line as the first reference torque when the vehicle speed is greater than the second reference speed and the engine-on torque line is set as the first reference torque,
wherein the second reference speed is equal to or greater than the first reference speed.

15. The method of claim 14, further comprising:
resetting, by the controller, the counter value to zero when the vehicle speed is greater than the second reference speed.

16. The method of claim 9, further comprising:
starting, by the controller, the engine when the driver demand torque of the driver is greater than the engine-on torque line when the engine is stopped.

17. An apparatus for controlling engine start for a hybrid electric vehicle, comprising:
a data detector configured to detect data for controlling start of an engine; and
a controller configured to calculate a driver demand torque based on a position of an accelerator pedal, a vehicle speed, and a gear step and calculate a driver demand power based on the data and by multiplying the vehicle speed by the driver demand torque, and start the engine when the driver demand power is greater than an engine-on power line which is a reference for starting the engine,
wherein the controller is further configured to compare the driver demand power with a first reference power, calculate an elapsed time from a time at which the driver demand power is greater than the first reference power to a time at which the driver demand power becomes equal to or less than the first reference power, increase a counter value when the elapsed time is equal to or less than a first reference time and the vehicle speed is equal to or less than a first reference speed, and set the engine-on power line as a second reference power when the counter value is greater than a threshold value, and
wherein the second reference power is greater than the first reference power.

18. The apparatus of claim 17, wherein the controller is configured to set the engine-on power line as the first reference power when the counter value is less than the threshold value.

19. The apparatus of claim 17, wherein the counter value is increased when the elapsed time is equal to or less than the first reference time, the vehicle speed is equal to or less than the first reference speed, and the gear step is within a predetermined gear step range.

20. The apparatus of claim 17, wherein the controller is configured to:
change the engine-on power line to the first reference power when the elapsed time is greater than a second reference time and the engine-on power line is set as the second reference power; and
maintain the engine-on power line as the first reference power when the elapsed time is greater than the second reference time and the engine-on power line is set as the first reference power,
wherein the second reference time is equal to or greater than the first reference time.

21. The apparatus of claim 20, wherein the controller is configured to reset the counter value to zero when the elapsed time is greater than the second reference time.

22. The apparatus of claim 17, wherein the controller is configured to:
change the engine-on power line to the first reference power when the vehicle speed is greater than a second reference speed and the engine-on power line is set as the second reference power; and
maintain the engine-on power line as the first reference power when the vehicle speed is greater than the second reference speed and the engine-on power line is set as the first reference power,
wherein the second reference speed is equal to or greater than the first reference speed.

23. The apparatus of claim 22, wherein the controller is configured to reset the counter value to zero when the vehicle speed is greater than the second reference speed.

24. The apparatus of claim 17, wherein the data detector includes:
an accelerator pedal position detector configured to detect the position of the accelerator pedal;
a vehicle speed detector configured to detect the vehicle speed; and
a gear step detector configured to detect the gear step.

25. An apparatus for controlling engine start of a vehicle, comprising:
a data detector configured to detect data for controlling start of an engine; and
a controller configured to calculate a driver demand torque based on the data and based on a position of an accelerator pedal, a vehicle speed, and a gear step, and start the engine when the driver demand torque is greater than an engine-on torque line which is a reference for starting the engine,
wherein the controller is further configured to compare the driver demand torque with a first reference torque, calculate an elapsed time from a time at which the driver demand torque is greater than the first reference torque to a time at which the driver demand torque becomes equal to or less than the first reference torque, increase a counter value when the elapsed time is equal to or less than a first reference time and the vehicle speed is equal to or less than a first reference speed, and set the engine-on torque line as a second reference torque when the counter value is greater than a threshold value, and
wherein the second reference torque is greater than the first reference torque.

26. The apparatus of claim 25, wherein the controller is configured to set the engine-on torque line as the first reference torque when the counter value is less than the threshold value.

27. The apparatus of claim 25, wherein the counter value is increased when the elapsed time is equal to or less than the first reference time, the vehicle speed is equal to or less than the first reference speed, and the gear step is within a predetermined gear step range.

28. The apparatus of claim 25, wherein the controller is configured to:
change the engine-on torque line to the first reference torque when the elapsed time is greater than a second reference time and the engine-on torque line is set as the second reference torque; and
maintain the engine-on torque line as the first reference torque when the elapsed time is greater than the second reference time and the engine-on torque line is set as the first reference torque,
wherein the second reference time is equal to or greater than the first reference time.

29. The apparatus of claim 28, wherein the controller is configured to reset the counter value to zero when the elapsed time is greater than the second reference time.

30. The apparatus of claim 25, wherein the controller is configured to:
change the engine-on torque line to the first reference torque when the vehicle speed is greater than a second reference speed and the engine-on torque line is set as the second reference torque; and
maintain the engine-on torque line as the first reference torque when the vehicle speed is greater than the second reference speed and the engine-on torque line is set as the first reference torque,
wherein the second reference speed equal to or greater than the first reference speed.

31. The apparatus of claim 30, wherein the controller is configured to reset the counter value to zero when the vehicle speed is greater than the second reference speed.

32. The apparatus of claim 25, wherein the data detector includes:
an accelerator pedal detector configured to detect the position of the accelerator pedal;
a vehicle speed detector configured to detect the vehicle speed; and
a gear step detector configured to detect the gear step.

* * * * *